United States Patent
Fischer

(10) Patent No.: US 7,986,859 B2
(45) Date of Patent: Jul. 26, 2011

(54) CONVERTING BAYER PATTERN RGB IMAGES TO FULL RESOLUTION RGB IMAGES VIA INTERMEDIATE HUE, SATURATION AND INTENSITY (HSI) CONVERSION

(75) Inventor: Philip Leapold Charles Fischer, Chapel Hill, NC (US)

(73) Assignee: Clarity Medical Systems, Inc., Pleasanton, CA (US)

(*) Notice: Subject to any disclaimer, the term of this patent is extended or adjusted under 35 U.S.C. 154(b) by 744 days.

(21) Appl. No.: 12/104,104

(22) Filed: Apr. 16, 2008

(65) Prior Publication Data

US 2009/0263047 A1    Oct. 22, 2009

(51) Int. Cl.
G06K 9/32 (2006.01)
G06K 9/00 (2006.01)

(52) U.S. Cl. ........................................ 382/300; 382/162

(58) Field of Classification Search ............... 382/300, 382/162–167; 348/242, 272, 273, 222.1, 348/223.1; 345/589–609; 358/512–520, 525

See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 6,181,376 B1 | 1/2001 | Rashkovskiy et al. | |
| 6,392,699 B1 * | 5/2002 | Acharya | 348/273 |
| 7,053,908 B2 | 5/2006 | Saquib et al. | |
| 7,079,705 B2 | 7/2006 | Zhang et al. | |
| 7,236,191 B2 * | 6/2007 | Kalevo et al. | 348/222.1 |
| 7,256,828 B2 * | 8/2007 | Nilsson et al. | 348/273 |

* cited by examiner

*Primary Examiner* — Sherali Ishrat
(74) *Attorney, Agent, or Firm* — Charles E. Krueger

(57) ABSTRACT

In one embodiment, R and B values for each G pixel element are interpolated and the RGB values are converted to HSI values. The converted HSI values are interpolated to determine interpolated HSI values for the R and B pixel elements and then the interpolated HSI values are converted to RGB values.

11 Claims, 3 Drawing Sheets

|  | COL 1 | COL 2 | COL 3 | COL 4 | COL 5 | COL 6 |
|---|---|---|---|---|---|---|
| ROW 1 | G | R | G | R | G | R |
| ROW 2 | B | G | B | G | B | G |
| ROW 3 | G | R | G | R | G | R |
| ROW 4 | B | G | B | G | B | G |
| ROW 5 | G | R | G | R | G | R |

FIG. 1

CONVERTING BAYER PATTERN RGB IMAGES TO FULL RESOLUTION RGB IMAGES VIA INTERMEDIATE HUE, SATURATION AND INTENSITY (HSI) CONVERSION

TECHNICAL FIELD

The present disclosure relates generally to digital imaging that uses a RGB (red, green and blue) Bayer filter pattern to capture color images.

BACKGROUND OF THE INVENTION

FIG. 1 illustrates the geometry of a Bayer filter. Each filter element is referred to by a letter representing the color of the filter element where G indicates green, R indicates red and B indicates blue. These filter elements are disposed over the individual photo sensors in a sensor array and are utilized to create color images. The sensor elements in the array correspond to pixel elements in an image. In the Bayer filter each pixel element outputs a sensor value indicating the amount of light that passes through the filter element disposed above the sensor element.

The frequency of the filters in the Bayer filter array is 50% G, 25% R and 25% B. These frequencies are selected to mimic the greater sensitivity of the human eye to green light.

In the following, a particular pixel element, or the sensor value output by the pixel element, in the array of FIG. 1 is referred to by the color of the filter element and the row and column of its location. For example, the filter element in the upper left-hand corner is referred to as G(1,1). In order to create a color image the actual RGB values of the scene being imaged is required for each pixel element. To this end, for a given pixel element such as G(3,3) the R and B values must be found by interpolation of the R and B sensor values from neighboring pixel elements.

There are many ways of converting an RGB Bayer filter (as shown in FIG. 1) image to a full resolution RGB image (see for example U.S. Pat. Nos. 3,971,065, 4,642,678, 6,181,376, 7,053,908, 7,079,705).

Most of these existing methods interpolate the missing sensor values from neighboring sensor values of the same color plane, under the assumption that the sensor values of neighboring pixel elements are highly correlated in an image. However, for image regions with high spatial frequency components such as sharp lines and edges, the correlation among neighboring pixel elements may be poor. Therefore, interpolation solely depending on the correlation of pixel neighboring elements may generate color aliasing artifacts in regions containing fine details. In addition, neighboring correlation interpolation methods may generate images with independent noise levels among the color planes, resulting in higher noise amplification during color correction processing.

Other methods aim at preserving high spatial frequency components (sharp edges) at the expense of smooth transitions and/or noise suppression. For example, there are interpolation algorithms incorporating both the neighboring sensor values and the raw sensor value of the current pixel element when calculating the missing color values. Such algorithms operate under the assumption that different color sensor values of the same pixel element are usually highly correlated. The correlation among the different colors is assumed to either be fixed for all images or the same across a single image. Color correlation assumption and the associated interpolation methods can offer improved edge and line reconstruction with less chromatic aliasing.

However, in some images, the improved edge and line reconstruction comes at the cost of reduced color saturation due to assumptions of fixed positive correlation among different color planes. The method taught in U.S. Pat. No. 4,642,678 is different in that it interpolates the deltas of red/green and blue/green (referred to as chrominance in the patent). All of the methods that use single pixel elements to determine color or intensity are prone to noise artifacts.

BRIEF DESCRIPTION OF THE DRAWINGS

FIG. 1 illustrates an example of a Bayer filter array.

DESCRIPTION OF EXAMPLE EMBODIMENTS

Overview

The output of a Bayer array having red (R), green (G) and blue (B) pixel elements, with each pixel element outputting an R, G, or B value is interpolated to obtain a color image. The R and B values for each G pixel element are interpolated utilizing R and B sensor values of neighboring R and B pixel elements in the Bayer array. The interpolated RGB values of each G pixel elements are converted to hue (H), saturation (S) and intensity (I) values and the converted HSI values are interpolated to determine interpolated HSI values for R and B pixel elements. The interpolated HSI values are converted to RGB values for each R and B pixel element.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

Figure 2:
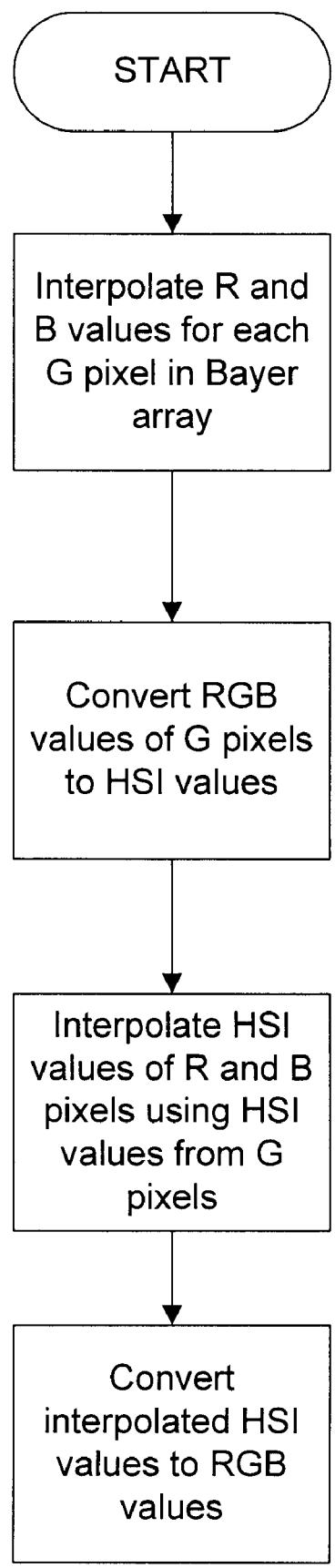
FIG. 2 is a flowchart illustrating the operation of an example embodiment.

An example embodiment will now be described with reference to FIG. 1 and the flow chart of FIG. 2. As depicted in FIG. 2 the first step is to find the RGB values of each G pixel element in the array. There are many methods that can be utilized to perform this step. One method is to take the average value of the neighboring R and B pixel element sensor values. Accordingly, for pixel element G(3,3) the R(3,3) value assigned is (R(3,2)+R(3,4))/2 and the B(3,3) value assigned is (B(2,3)+B(4,3))/2.

Once the RGB values have been assigned to each G pixel element the RGB values are converted to Hue, Saturation, and Intensity (HSI) values. As is known in the art, an alternative to specifying the RGB color values of a pixel element is to specify its HSI values. Different techniques exist to convert between RGB and HSI representations. Once the RGB values have been calculated for each G pixel element as described above the following formulae are utilized in this embodiment to determine the HSI values of each G pixel element.

$$r = \frac{R}{R+G+B}, \quad g = \frac{G}{R+G+B}, \quad b = \frac{B}{R+G+B}$$

$$h = \cos^{-1}\left\{\frac{0.5 \cdot [(r-g)+(r-b)]}{[(r-g)^2 + (r-b)(g-b)]^{1/2}}\right\} \quad h \in [0, \pi] \text{ for } b \leq g$$

$$h = 2\pi - \cos^{-1}\left\{\frac{0.5 \cdot [(r-g)+(r-b)]}{[(r-g)^2 + (r-b)(g-b)]^{1/2}}\right\} \quad h \in [\pi, 2\pi] \text{ for } b > g$$

$$s = 1 - 3 \cdot \min(r, g, b); \quad s \in [0.1]$$

$$i = \frac{(R+G+B)}{3 \cdot 255}; \quad i \in [0, 1]$$

$$H = h \times 180/\pi; \quad S = s \times 100; \quad I = i \times 255$$

Formulae for conversion between HSI and RGB values are available on the web2.clarkson website with the extension .edu/class/image_process/RGB_to_HIS.pdf. as well as other sources and are well-known in the art.

In this example embodiment, the HSI values calculated for each G pixel element are now used to interpolate hue values to neighboring pixel elements. In this example embodiment, a bi-cubic interpolation technique is utilized to assign the hue values to the R and B pixel elements. For example, for the pixel element R(3,4) of FIG. 1, the HSI values would be interpolated from G(2,4), G(3,3), G(3,5) and G(4,4). Accordingly, at least five pixel elements are involved in the interpolation, i.e., the R(3,4) pixel element itself and the four neighboring G pixel elements.

The HSI values will have less noise than RGB values because they are obtained, depending on interpolation method, using between 5 and 9 pixel elements to calculate each value compared to one to four pixel elements for RGB data. For example, some interpolation methods could use the four touching green pixels of R(3,4) as well as the four blue touching pixels. For a very noisy image, the center green pixel can be selected and a weighted average performed with the other four green pixels.

After the interpolation in HSI space, it is necessary to convert back to RGB space in order to store or display the image, as almost all image display devices and image file formats expect the image to be in an RGB format. In this embodiment, the interpolated HSI values for each pixel element are converted back to RGB values using the following formulae:

$$h = H \cdot \pi/180; \quad s = S/100; \quad i = I/255$$

$$x = i \cdot (1-s)$$

$$y = i \cdot \left[1 + \frac{s \cdot \cos(h)}{\cos\left(\frac{\pi}{3} - h\right)}\right]$$

$$z = 3i - (x+y);$$

when $h < 2\pi/3$, $b = x$; $r = y$ and $g = z$.

when $2\pi/3 \leq h < 4\pi/3$, $h = h - 2\pi/3$, and $r = x$; $g = y$ and $b = z$ when $4\pi/3 \leq h < 2\pi$, $h = h - 4\pi/3$, and $g = x$; $b = y$ and $r = z$.

where $r, g, b$ is the same as $R, G, B$.

These RGB values can than be utilized to generate a color image on a digital display device.

Any standard interpolation method can be used to interpolate the HSI values for each of the red and blue pixel elements in the Bayer pattern image. The hue interpolation is special in that hue is circular and the interpolation methods will need to take that into account. A value is circular if the lowest and highest values are very similar and values in the middle of the range are very different. For hue, the values may be scaled to 0-360 degrees, with 0 and 360 being equivalent.

Using a simple bi-linear interpolation method, the intensity value of the HSI values would be at least the average of 5 pixel elements. Averaging at least 5 pixel elements together reduces noise by the square root of 5 or more.

Other existing simple conversion methods (bi-linear, bi-cubic or polynomial) use a single pixel element to fill in missing RGB values using a small number (2 to 4 depending on color and method) of neighboring pixel and just a single pixel element for the non-missing color.

Variations of interpolation methods may be used. Linear, bi-linear or other techniques may be used to replace the bi-cubic spline interpolations used in the example embodiment.

The above-described example embodiments have applications wherever a Bayer pattern image is used. These include but are not limited to the following: consumer and professional digital cameras (almost all use a Bayer pattern sensor), single sensor industrial and scientific cameras and medical devices that use single sensor color cameras.

Figure 3:
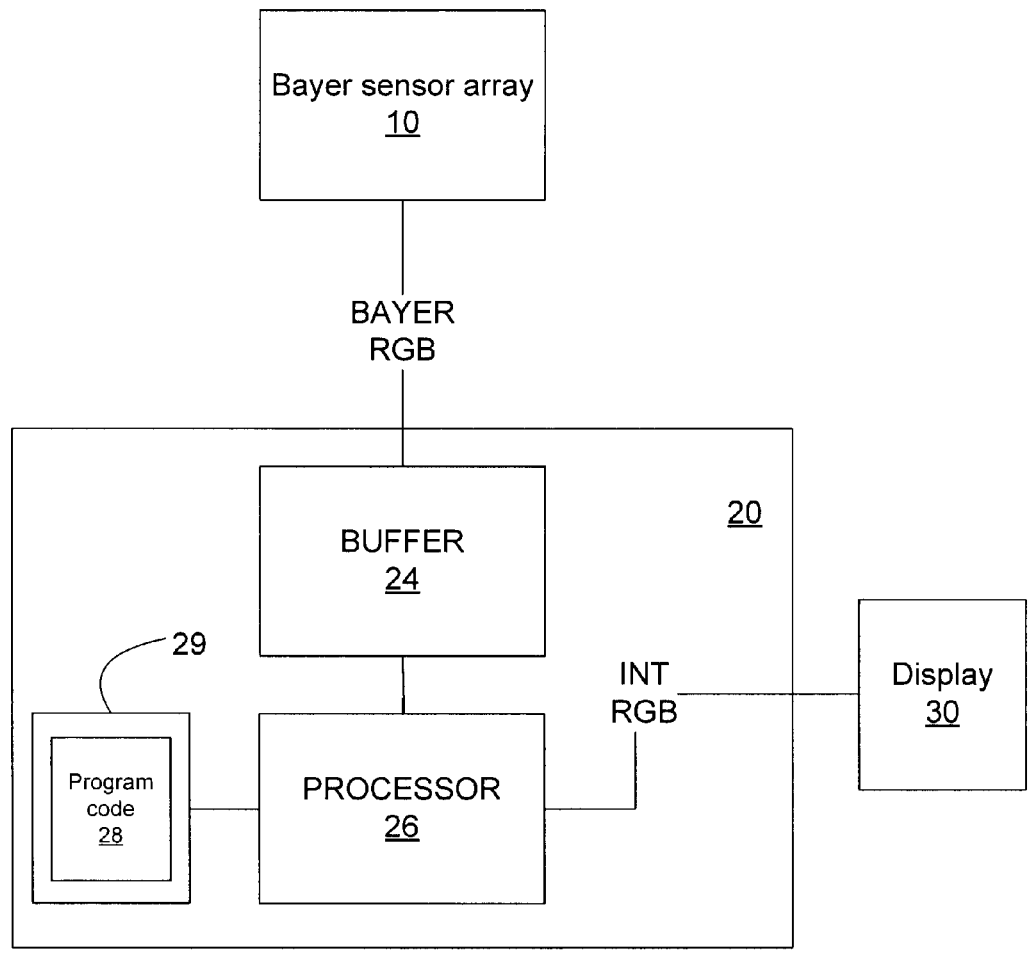
FIG. 3 illustrates an image processing system for implementing an example embodiment.

FIG. 3 depicts an example of an image processing system 20 for implementing the above-described example embodiment. In FIG. 3 the output of the Bayer array 10 is input to a buffer 24 on the image processing system. A processor 26 executes program code 28 stored in one or more computer-readable storage media 29 to implement the steps of the example embodiments described above. The interpolated RGB values can be output to a display device 30 to display an image incident on the Bayer sensor array 10. Alternatively, hard-wired logic of Application Specific Integrated Circuits (ASICs) can be utilized to implement the described embodiments.

The invention has now been described with reference to the example embodiments. Alternatives and substitutions will now be apparent to persons of skill in the art. Accordingly, it is not intended to limit the invention except as provided by the appended claims.

What is claimed is:

1. A method for interpolating red (R), green (G) and blue (B) sensor values for a first non-green pixel element of a Bayer array of pixel elements, with each pixel element in the Bayer array outputting an R, G, or B sensor value, the method comprising:
    interpolating R and B sensor values for each green pixel element adjacent to the first non-green pixel element, with each green pixel element outputting a G sensor value, where interpolating utilizes R and B sensor values output by R and B pixel elements adjacent to each green pixel element to obtain interpolated R and B sensor values for each green pixel element adjacent to the first non-green pixel element;
    converting the interpolated R and B sensor values and the G sensor value of each green pixel element adjacent to the first non-green pixel element to hue (H), saturation (S) and intensity (I) values for each green pixel element adjacent to the first non-green pixel element;
    interpolating converted H, S and I values of each green pixel element adjacent to the first non-green pixel element to determine interpolated H, S, and I values for the first non-green pixel element; and converting interpolated H, S, and I values of the first non-green pixel element to a first set of RGB values for the first non-green pixel element.

2. The method of claim 1 wherein interpolating converted H, S, and I values comprises:
performing bi-cubic interpolation.

3. The method of claim 1 with interpolating R and B sensor values for each green pixel element comprising:
averaging the R sensor values of R pixel elements adjacent to the green pixel element; and
averaging the B sensor values of neighboring B pixel elements adjacent to the green pixel element.

4. The method of claim 1 further comprising:
interpolating sensor values output by non-green pixel elements adjacent to the first non-green pixel element with the first set of RGB values to obtain a second set of RGB values for the first non-green pixel element.

5. The method of claim 1 further comprising:
outputting interpolated RGB values to a display to display an image incident on the Bayer array.

6. A system for interpolating red (R), green (G) and blue (B) sensor values for a first non-green pixel element of a Bayer array of pixel elements, with each pixel element in the Bayer array outputting an R, G, or B sensor value, the system comprising:
means for interpolating R and B sensor values for each green pixel element adjacent to the first non-green pixel element, with each green pixel element outputting a G sensor value, where interpolating utilizes R and B sensor values output by R and B pixel elements adjacent to each green pixel element to obtain interpolated R and B sensor values for each green pixel element adjacent to the first non-green pixel element;
means for converting the interpolated R and B sensor values and the G sensor value of each green pixel element adjacent to the first non-green pixel element to hue (H), saturation (S) and intensity (I) values for each green pixel element adjacent to the first non-green pixel element;
means for interpolating converted H, S and I values of each green pixel element adjacent to the first non-green pixel element to determine interpolated H, S, and I values for the first non-green pixel element; and
means for converting interpolated H, S, and I values of the first non-green pixel element to a first set of RGB values for the first non-green pixel element.

7. The system of claim 6 wherein means for interpolating converted H, S, and I values comprises:
means for performing bi-cubic interpolation.

8. The system of claim 6 with means for interpolating R and B sensor values for each green pixel element comprising:
means for averaging the R sensor values of R pixel elements adjacent to the green pixel element; and
means for averaging the B sensor values of neighboring B pixel elements adjacent to the green pixel element.

9. The system of claim 6 further comprising:
means for interpolating sensor values output by non-green pixel elements adjacent to the first non-green pixel element with the first set of RGB values to obtain a second set of RGB values for the first non-green pixel element.

10. The system of claim 6 further comprising:
means for outputting interpolated RGB values to a display to display an image incident on the Bayer array.

11. An apparatus comprising:
a memory holding a set of red (R), green (G) and blue (B) sensor values output by a Bayer array of pixel elements and holding program code;
a processor coupled to the memory and configured to execute the program code to interpolate red (R), green (G) and blue (B) sensor values for a first non-green pixel element of the Bayer array of pixel elements, with each pixel element in the Bayer array outputting an R, G, or B sensor value, with the processor further configured to execute the program code to interpolate R and B sensor values for a each green pixel element adjacent to the first non-green pixel element, with each green pixel element outputting a G sensor value, where interpolating utilizes R and B sensor values output by R and B pixel elements adjacent to each green pixel element to obtain interpolated R and B sensor values for the each green pixel element adjacent to the first non-green pixel element, to convert the interpolated R and B sensor values and the G sensor value of each green pixel element adjacent to the first non-green pixel element to hue (H), saturation (S) and intensity (I) values for each green pixel element adjacent to the first non-green pixel element, to interpolate converted H, S and I values of each green pixel element adjacent to the first non-green pixel element to determine interpolated H, S, and I values for the first non-green pixel element, and to convert interpolated H, S, and I values of the first non-green pixel element to a first set of RGB values for the first non-green pixel element.

* * * * *